(12) United States Patent
Yun et al.

(10) Patent No.: US 11,171,807 B2
(45) Date of Patent: Nov. 9, 2021

(54) METHOD AND APPARATUS FOR ALLOCATING PRIORITY TRANSMISSION OPPORTUNITIES IN VEHICLE NETWORK

(71) Applicants:Hyundai Motor Company, Seoul (KR); Kia Motors Corporation, Seoul (KR); Industry-University Cooperation Foundation Hanyang University, Seoul (KR)

(72) Inventors: Jin Hwa Yun, Seoul (KR); Dong Ok Kim, Gyeonggi-do (KR); Byung Joo Kim, Seoul (KR); Sung Kwon Park, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 83 days.

(21) Appl. No.: 16/667,040

(22) Filed: Oct. 29, 2019

(65) Prior Publication Data

US 2020/0136857 A1 Apr. 30, 2020

Related U.S. Application Data

(60) Provisional application No. 62/752,748, filed on Oct. 30, 2018.

(30) Foreign Application Priority Data

Oct. 23, 2019 (KR) .......................... 10-2019-0132549

(51) Int. Cl.
*H04L 12/40* (2006.01)
*H04L 12/12* (2006.01)

(52) U.S. Cl.
CPC .......... *H04L 12/4015* (2013.01); *H04L 12/12* (2013.01); *H04L 12/40039* (2013.01);
(Continued)

(58) Field of Classification Search
CPC .................... H04L 12/12; H04L 12/22; H04L 12/40006–40045; H04L 12/40143;
(Continued)

(56) References Cited

U.S. PATENT DOCUMENTS 8,213,438 B2 * 7/2012 Larsen ................ H04W 40/246
 370/400
9,629,085 B2 * 4/2017 Park .................. H04W 52/0216
(Continued)

OTHER PUBLICATIONS

IEEE Computer Society, "Amendment 4: Physical Layer Specifications and Management Parameters for 1 Gb/s Operation over a Single Twisted-Pair Copper Cable", IEEE Std 802.3bp-2016, 211pages.
(Continued)

*Primary Examiner* — Chi H Pham
*Assistant Examiner* — Vladislav Y Agureyev
(74) *Attorney, Agent, or Firm* — Mintz Levin Cohn Ferris Glovsky and Popeo, P.C.; Peter F. Corless

(57) ABSTRACT

An operation method of a first end node in a vehicle network supporting a PLCA function is provided. The method includes performing a monitoring operation in a first time interval configured for communication of the first end node and detecting a transmission request signal transmitted from a second end node by the monitoring operation. In response to detecting the transmission request signal, a transmission operation of the first end node in the first time interval is stopped. The first time interval is used for communication of a second end node instead of the first end node.

18 Claims, 13 Drawing Sheets

(52) U.S. Cl.
CPC ......... *H04L 2012/40215* (2013.01); *H04L 2012/40241* (2013.01)

(58) Field of Classification Search
CPC .................. H04L 12/4015–40156; H04L 2012/40208–40293; Y02D 30/00–70
See application file for complete search history.

(56) References Cited

U.S. PATENT DOCUMENTS

| | | | | |
|---|---|---|---|---|
| 2005/0068934 | A1* | 3/2005 | Sakoda | H04W 48/08 370/350 |
| 2010/0118698 | A1* | 5/2010 | Yokobori | H04W 74/085 370/230 |
| 2013/0229995 | A1* | 9/2013 | Cai | H04W 72/10 370/329 |
| 2014/0036876 | A1* | 2/2014 | Li | H04W 76/15 370/336 |
| 2015/0016309 | A1* | 1/2015 | Fang | H04J 11/0023 370/277 |
| 2016/0359893 | A1* | 12/2016 | Kishikawa | H04L 12/40013 |
| 2017/0374623 | A1* | 12/2017 | Dhar | H04W 52/146 |
| 2019/0230705 | A1* | 7/2019 | Beruto | H04W 74/085 |
| 2019/0246351 | A1* | 8/2019 | Yang | H04W 52/0216 |
| 2019/0261420 | A1* | 8/2019 | Pannell | H04L 1/0041 |
| 2019/0363991 | A1* | 11/2019 | Sostawa | H04L 47/32 |
| 2019/0364492 | A1* | 11/2019 | Azizi | H04W 52/0264 |
| 2020/0067727 | A1* | 2/2020 | Pannell | H04L 12/40163 |
| 2020/0083974 | A1* | 3/2020 | Dalmia | H04L 12/12 |
| 2020/0296692 | A1* | 9/2020 | Lee | H04W 24/10 |

OTHER PUBLICATIONS

LAN/MAN Standards Committee of the IEEE Computer Society, "Draft Standard for Ethernet Amendment: Draft Standard for Ethernet Amendment: Physical Layer Specifications and Management Parameters for 10 Mb/s Operation over Single Balanced Twisted-pair Cabling and Associated Power Delivery", IEEE P802.3cg/D1.1, Feb. 12, 2018, 184 pages.
IEEE Computer Society, "IEEE Standard for Ethernet", IEEE Std 802.3-2012, 634 pages.

* cited by examiner

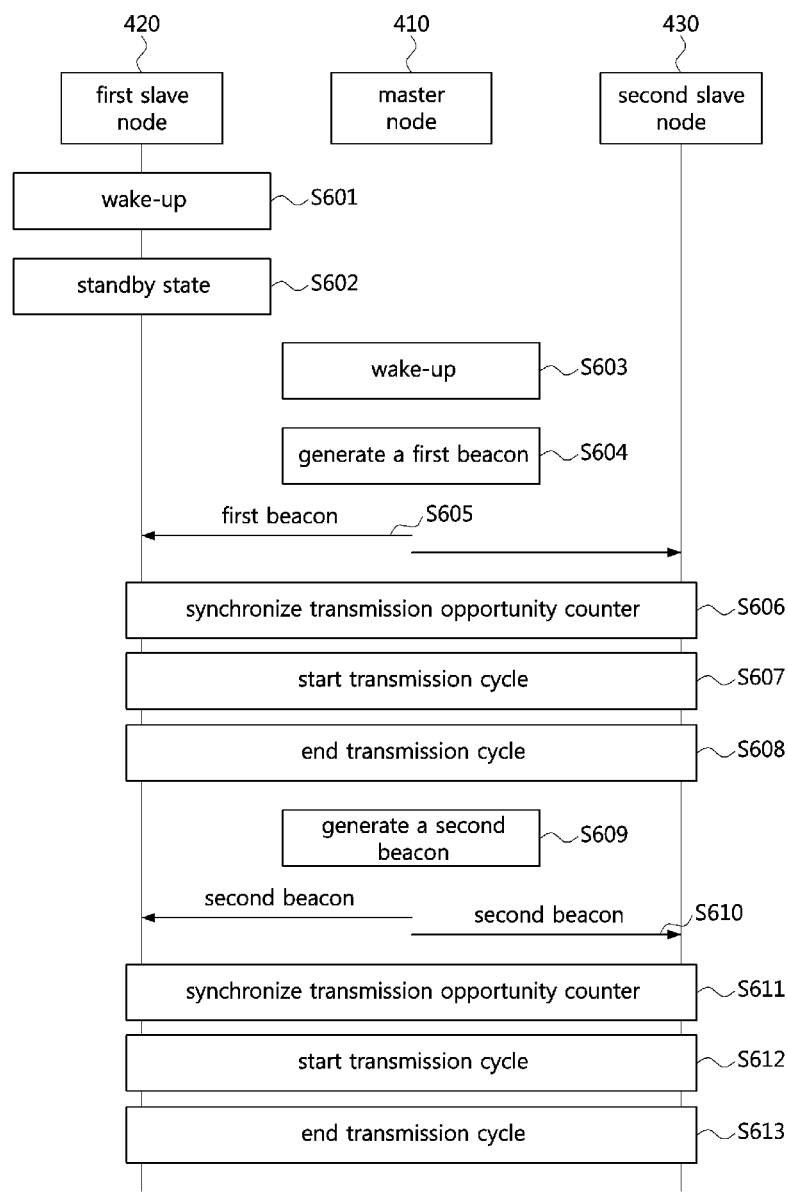

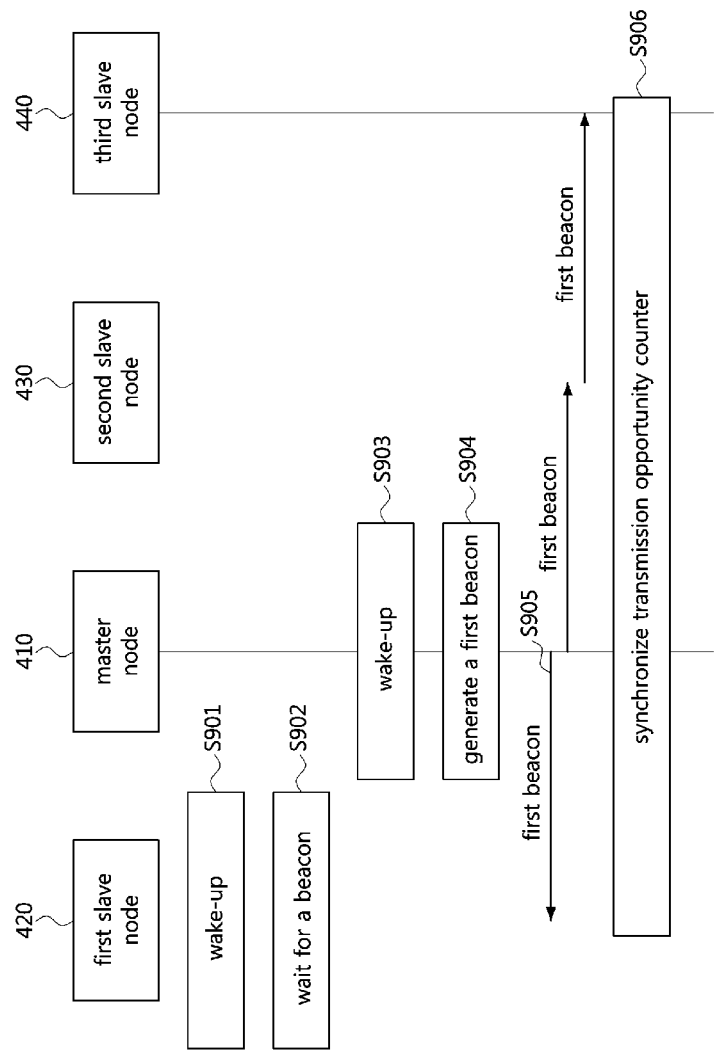

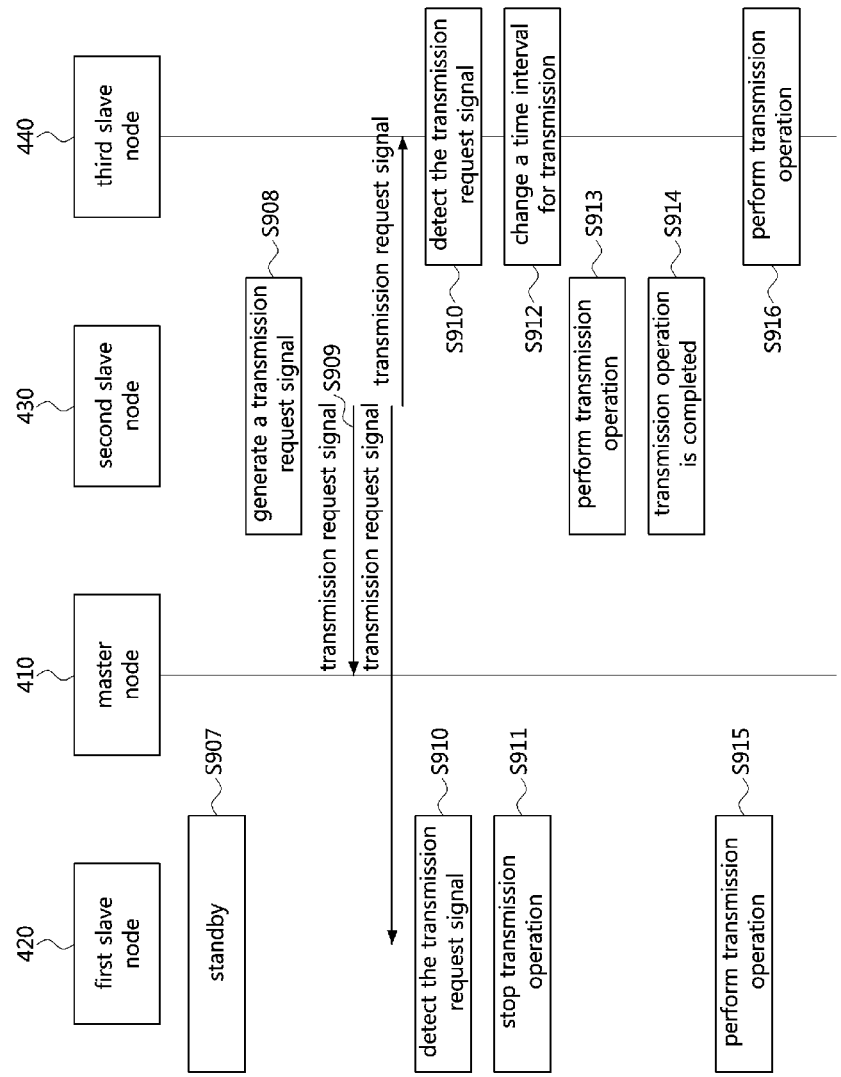

METHOD AND APPARATUS FOR ALLOCATING PRIORITY TRANSMISSION OPPORTUNITIES IN VEHICLE NETWORK

CROSS-REFERENCE TO RELATED APPLICATION

This application claims the benefit of priority to U.S. Patent Application No. 62/752,748, filed on Oct. 30, 2018 in the U.S. Patent and Trademark Office, and Korean Patent Application No. 10-2019-0132549, filed on Oct. 23, 2019 in the Korean Intellectual Property Office (KIPO), the entirety of which is incorporated by reference as if fully set forth herein.

TECHNICAL FIELD

The present disclosure relates to a technology for communications in a vehicle network technology, and more specifically, to an operation method of an end node in a vehicle network including an Ethernet-based network and an apparatus for the same.

BACKGROUND

The number and variety of devices installed in vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks is costly. Due to these limitations, an Ethernet-based network is often utilized as a vehicle network. The Ethernet-based network may support bi-directional communication through one pair of windings and may support a transmission rate of up to 10 Gbps.

One of the Ethernet protocols that a vehicle network is capable of supporting may be 10 single pair Ethernet (SPE). In case of a 10SPE network to which a plurality of nodes are connected, when a plurality of end nodes are to simultaneously transmit data packets to other end nodes, collision may occur between the different data packets in a PHY layer. The plurality of end nodes connected to the 10SPE network may use a PHY layer collision avoidance (PLCA) function to avoid the collision in the PHY layer. The PLCA function refers to a function of sequentially granting transmission opportunities for transmitting data packets to the plurality of end nodes connected to the 10SPE network. The PLCA function may provide improved performance in a multi-drop Ethernet network with fewer nodes (e.g., less than 16 nodes) through a low propagation delay.

Meanwhile, the current PLCA function uses a round-robin scheduling algorithm to ensure fairness. In this case, fairness may be ensured since all nodes in the PHY layer are provided with transmission opportunities. However, in case of an in-vehicle network (IVN) where emergency data should be transmitted and received (e.g., a situation where a brake or an airbag should be operated), it may be difficult to apply the current PLCA function as it is.

SUMMARY

The present disclosure provides a method and an apparatus for enabling an end node having urgent data to rapidly have a transmission opportunity.

In accordance with an exemplary embodiment of the present disclosure, an operation method of a first end node in a vehicle network supporting a PLCA function may include performing a monitoring operation in a first time interval configured for communication of the first end node; detecting a transmission request signal transmitted from a second end node by the monitoring operation; and in response to detecting the transmission request signal, stopping a transmission operation of the first end node in the first time interval. The first time interval may be used for communication of a second end node instead of the first end node.

The first end node may include a first entity performing a physical (PHY) layer function and a second entity performing a medium access control (MAC) layer function, and in response to detecting the transmission request signal, a first indicator indicating that the transmission request signal is detected and a second indicator indicating that a collision occurs in the first time interval may be transmitted from the first entity to the second entity.

When the first indicator and the second indicator are received at the second entity, data may not be transferred from the second entity to the first entity. The transmission request signal may be a low power idle (LPI) signal generated by the second end node that supports an energy efficient Ethernet (EEE) function. The transmission request signal may include an identifier of the second end node, and the transmission request signal may be used to indicate that there is emergency data to be transmitted at the second end node indicated by the identifier.

The transmission request signal may include information indicating a transmission priority of the second end node, and the transmission operation of the first end node may be stopped in the first time interval when the transmission priority of the second end node is higher than a transmission priority of the first end node. The transmission request signal may include a timer value that indicates a transmission time during which the second end node performs a transmission operation, and the transmission operation of the first end node may be resumed after a timer set according to the timer value expires.

The first end node may include a first entity that performs a PHY layer function and a second entity that performs a MAC layer function, the timer value included in the transmission request signal may be transferred from the first entity to the second entity. When a timer set according to the timer value expires, data may be transferred from the second entity to the first entity.

The operation method may further include, when the transmission operation of the second end node is completed in the first time interval, performing the transmission operation of the first end node in a second time interval after the first time interval. Additionally, the operation method may include receiving a beacon from a third end node when the transmission operation of the second end node is completed in the first time interval; and performing the transmission operation of the first end node in a second time interval indicated by the beacon.

In accordance with another exemplary embodiment of the present disclosure, an operation method of a first end node in a vehicle network supporting a PLCA function may include generating a transmission request signal indicating that data to be transmitted exists; transmitting the transmission request signal in a first time interval configured for communication of a second end node; and performing a transmission operation of the first end node in the first time interval. The first time interval may be used for communication of the first end node instead of the second end node.

The transmission request signal may be a low power idle (LPI) signal generated by the first end node that supports an energy efficient Ethernet (EEE) function. The transmission request signal may include an identifier of the first end node, and the transmission request signal may be used to indicate that there is emergency data to be transmitted at the first end node indicated by the identifier.

The transmission request signal may include a timer value that indicates a transmission time during which the first end node performs a transmission operation, and the transmission operation of the second end node may be resumed after a timer set according to the timer value expires. The transmission request signal may include information indicating a transmission priority of the first end node. The transmission operation of the first end node may be performed in the first time interval when the transmission priority of the first end node is higher than a transmission priority of the second end node.

In accordance with still another exemplary embodiment of the present disclosure, an operation method of a first end node in a vehicle network supporting a PLCA function may include detecting a transmission request signal transmitted from a third end node in a first time interval configured for communication of a second end node; in response to detecting the transmission request signal, changing a time interval configured for communication of the first end node from a second time interval to a third time interval after the second time interval; and performing a transmission operation of the first end node in the third time interval. A transmission operation of the third end node may be performed in the first time interval, and the transmission operation of the second end node may be performed in the second time interval after the first time interval.

The first end node may include a first entity that performs a physical (PHY) layer function and a second entity that performs a medium access control (MAC) layer function. In response to detecting the transmission request signal, a first indicator indicating that the transmission request signal is detected and a second indicator indicating that a collision occurs in the first time interval may be transmitted from the first entity to the second entity.

The transmission request signal may be a low power idle (LPI) signal generated by the third end node that supports an energy efficient Ethernet (EEE) function. The transmission request signal may include an identifier of the third end node, and the transmission request signal may be used to indicate that there is emergency data to be transmitted at the third end node indicated by the identifier. The transmission request signal may include a timer value that indicates a transmission time during which the third end node performs a transmission operation. The transmission operation of the first end node may be resumed after a timer set according to the timer value expires and the transmission operation of the second end node is completed.

According to the exemplary embodiments of the present disclosure, in an Ethernet-based (e.g., 10SPE) network environment, a high priority end node (e.g., brake, airbag, or the like) may have more transmission opportunities. Through this, communication reliability in communication between end nodes may be improved, and the performance of the vehicle network may be improved.

However, effects of the method and apparatus for allocating transmission opportunities in the vehicle network according to the exemplary embodiments of the present disclosure are not limited to those mentioned above. Other effects not mentioned will be clearly understood by those skilled in the art from the following description.

BRIEF DESCRIPTION OF DRAWINGS

Exemplary embodiments of the present disclosure will become more apparent by describing in detail forms of the present disclosure with reference to the accompanying drawings, in which:

FIG. 6 is a sequence chart illustrating a first exemplary embodiment of an operation method of end nodes belonging to a vehicle network;

FIGS. 9A and 9B are sequence charts illustrating an exemplary embodiment of an operation method of an end node during the transmission cycle according to FIG. 8A or 8B.

Figure 1:
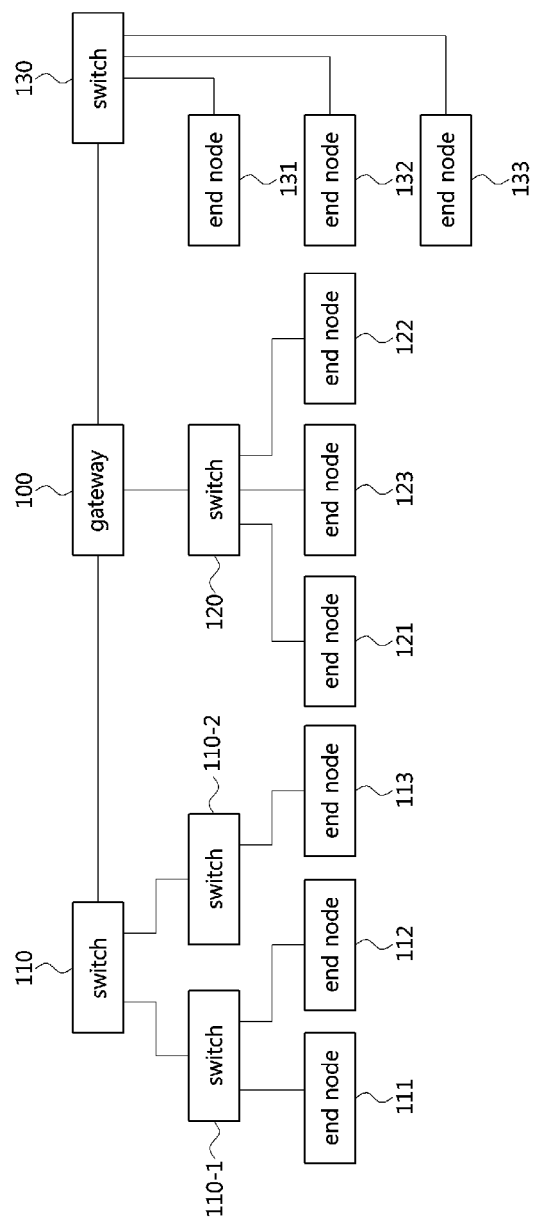
FIG. 1 is a block diagram illustrating a first exemplary embodiment of a vehicle network topology.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described exemplary embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Notably, the controller may be specifically programmed to execute the program instructions. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology. As shown in FIG. 1, a communication node of a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol.

Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and operate at least one of the end nodes 111, 112, 113, 121, 122, 123, 124, 125, 131, 132, and 133 connected to the switch. Each of the end nodes 111, 112, 113, 121, 122, 123, 124, 125, 131, 132, and 133 may include an electronic control unit (ECU) or controller configured to operate various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

The communication nodes (i.e., gateways, switches, end nodes, etc.) of the vehicle network may be connected in a star topology, a bus topology, a ring topology, a tree topology, a mesh topology, or the like. Further, each of the communication nodes of the vehicle network may support the CAN protocol, the FlexRay protocol, the MOST protocol, the LIN protocol, the Ethernet protocol, or the like. The exemplary embodiments according to the present disclosure may be applied to the network topology described above, the network topology to which the exemplary embodiments according to the present disclosure is applied may be variously configured without being restricted the above-described network topology.

Figure 2:
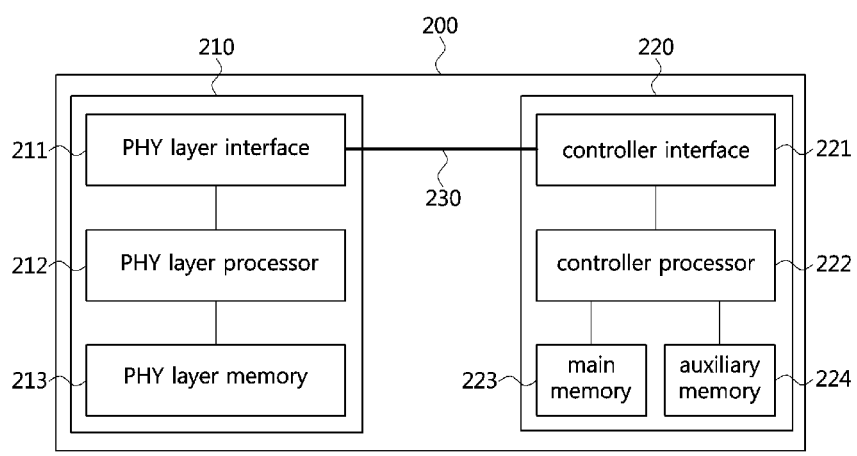
FIG. 2 is a block diagram illustrating a first exemplary embodiment of a communication node belonging to a vehicle network.

FIG. 2 is a block diagram illustrating a first exemplary embodiment of a communication node belonging to a vehicle network. As shown in FIG. 2, a communication node 200 of a vehicle network may include a physical (PHY) layer unit 210 and a controller unit 220. The communication node 200 may further include a regulator (not shown) configured to supply power. In particular, the controller 220 may be implemented to include a medium access control (MAC) layer. The PHY layer 210 may be configured to receive or transmit signals from or to another communication node. The controller 220 may be configured to operate the PHY layer unit 210 and perform various functions (e.g., an infotainment function, or the like). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller unit 220 may be configured to monitor and operate the PHY layer unit 210 using the MII 230. The controller unit 220 may include a controller interface 221, a controller processor 222, a main memory 223, and an auxiliary memory 224. The controller processor 222 is an electric circuitry configured to perform various functions described below. The configuration of the controller unit 220 is not limited thereto, and the controller 220 may be configured in various ways. The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for operating the controller interface 221, the main memory 223, and the auxiliary memory 224.

The memory control logic may be implemented to be included in the main memory 223 and the auxiliary memory 224 or may be implemented to be included in the controller processor 222. Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222.

The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
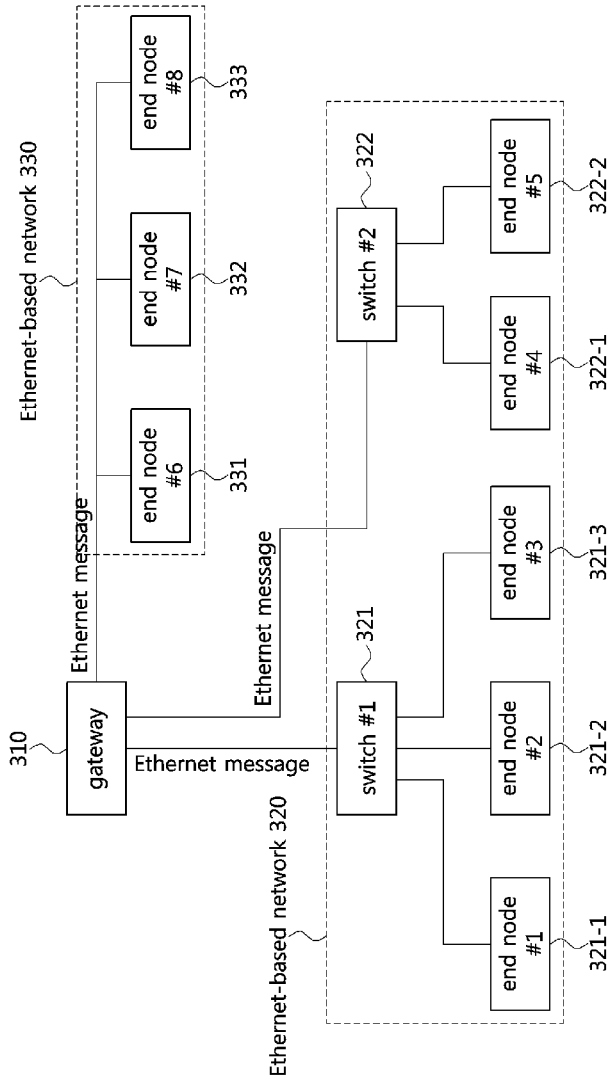
FIG. 3 is a block diagram illustrating a second exemplary embodiment of a vehicle network topology.
Figure 4:
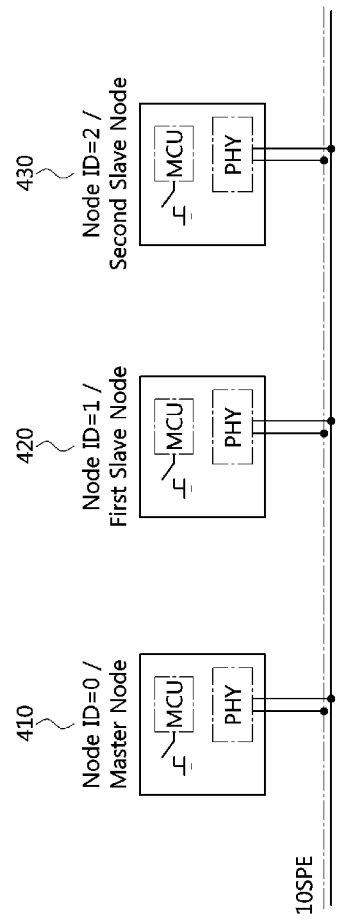
FIG. 4 is a block diagram illustrating an exemplary embodiment of a 10SPE network.

FIG. 3 is a block diagram illustrating a second exemplary embodiment of a vehicle network topology, and FIG. 4 is a block diagram illustrating an exemplary embodiment of a 10SPE network. As shown in FIG. 3, a vehicle network may include a plurality of Ethernet based networks 320 and 330. A gateway 310 of the vehicle network may support Ethernet-based network communication. The Ethernet-based networks may include a switch #1 321, a switch #2 322, an end node #1 321-1, an end node #2 321-2, an end node #3 321-3, an end node #4 322-1, an end node #5 322-1, an end node #6 331, an end node #7 332, an end node #8 333, and the like. The end node #1 321-1, the end node #2 321-2, and the end node #3 323-1 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333, which are connected by a 10SPE network scheme, may be connected to the gateway 310 via a bus or a single pair of wires.

Messages based on the Ethernet protocol may be referred to as 'Ethernet messages', and the Ethernet messages may be referred to also as 'Ethernet frames', 'Ethernet signals', 'Ethernet packets', or the like. The end nodes 321, 321-1, 321-2, 321-3, 322, 322-1, 322-2, 331, 332, and 333, which are part of the Ethernet-based network, may be configured to communicate using Ethernet messages. Communication between the Ethernet-based networks and the gateway 310 may also be performed using Ethernet messages.

As shown in FIG. 4, the end nodes of the Ethernet-based network (e.g., the 10 SPE network) may be configured with a master-slave relationship. For example, one end node 410 of the end nodes of the vehicle network may be a master node, and the remaining nodes 420 and 430 except the master node 410 may be slave nodes. The master node 410 and slave nodes 420 and 430 may operate in a sleep state, and when a local wake-up signal or a remote wake-up signal is received, an operation state of each of the master node 410 and the slave nodes 420 and 430 may transition from the sleep state to a wake-up state.

The master node 410 and the slave nodes 420 and 430 of the Ethernet-based network may refer to electronic control units (ECUs) of controllers configured to operate various devices included in the vehicle. Each of the end nodes of the vehicle network may support the Ethernet protocol. The master node 410 and slave nodes 420 and 430 may be connected in a bus topology. Additionally, the master node 410 and the slave nodes 420 and 430 may be connected in a power over data lines (PoDL) scheme through a pair of wires. The pair of wires may be wires to supply power to the end node or transfer data packets between the end nodes.

The master node 410 among the end nodes of the Ethernet-based network may be configured to supply a signal and power to wake up the other slave nodes 420 and 430 through a pair of wires. Then, the master node 410 may be configured to communicate with the slave nodes 420 and 430 through a pair of wires. The slave nodes 420 and 430 may be configured to receive the signal from the master node 410 through a pair of wires, and may be configured to transmit and receive data packets with other nodes through a pair of wires.

When a plurality of end nodes connected to the Ethernet-based network desire to simultaneously transmit data packets to other end nodes, collisions between different data packets may occur in the PHY layer. A plurality of end nodes connected to the 10SPE network may use a PHY layer collision avoidance (PLCA) function to avoid collision in the PHY layer. In other words, the PLCA function may be a function of sequentially granting a transmission opportunity for transmitting a data packet to a plurality of end nodes connected to the 10SPE network.

Figure 5:
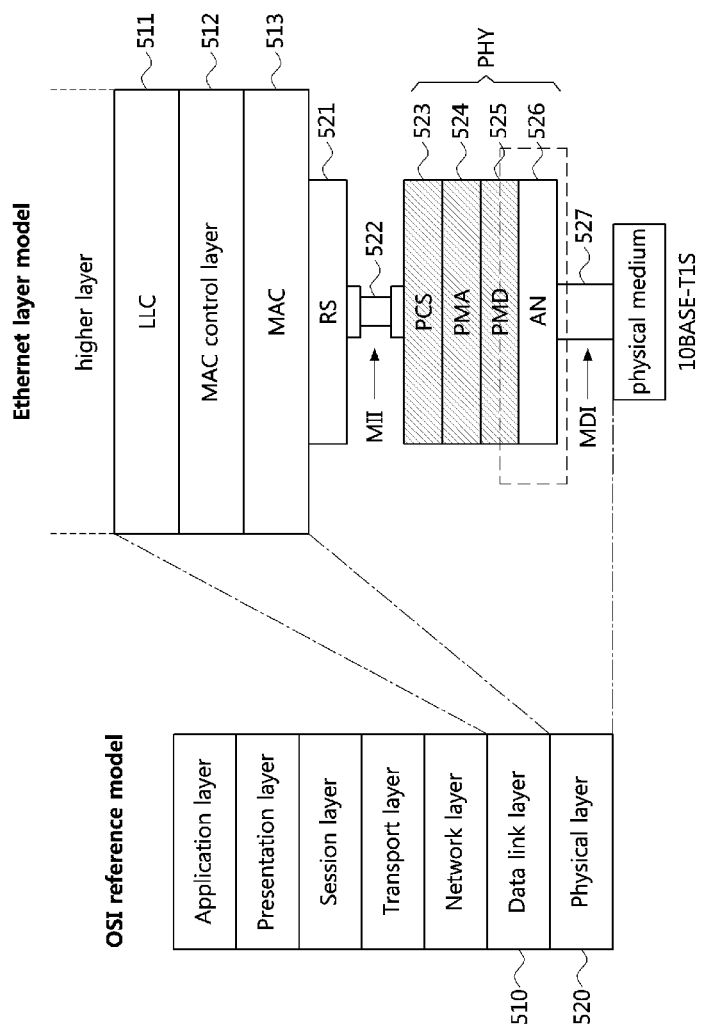
FIG. 5 is a conceptual diagram illustrating an Ethernet layer model according to an exemplary embodiment.

FIG. 5 is a conceptual diagram illustrating an Ethernet layer model. As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or other MAC client sublayer 511, a MAC control sublayer 512, and a MAC sublayer 513.

The MAC layer of the Ethernet layer model may be connected to the PHY layer through a reconciliation sublayer (RS) 521 and an MII sublayer 522. The RS 521 and the Mil sublayer 522 of the Ethernet layer model may correspond to a PHY layer 520 of the OSI reference model. The RS 521 may be configured to adjust logical signal mapping between the MAC sublayer 513 and a PCS 523 to be described later.

The RS 521 may be a sublayer that supports the PCLA function between the MAC layer and the PHY layer connected via the MII sublayer 522. The RS 521 may be configured to adjust mapping of signals between the MAC sublayer and the PCS 523 during a predetermined time slot to prevent collision in the PHY layer due to transmission of frames. The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526.

The PCS 523 may be configured to obtain data from the MAC layer, and perform line coding on the data based on a protocol of the network (e.g., a transmission speed, etc.). The PCS 523 may be configured to transfer the data generated as a result of the line encoding to the PMA sublayer 524. The PMA sublayer 524 may be configured to obtain the data generated as a result of the line encoding from the PCS 523, and may be configured to convert the obtained data into a physical signal. The PMA sublayer 524 may be configured to transfer the data converted into the physical signal to the PMD sublayer 525. The PMD sublayer 525 may be configured to obtain the data converted into the physical signal from the PMA sublayer 524, and may be configured to convert the obtained physical signal to be suitable for a physical medium connected to the PHY layer.

The AN sublayer 526 may be a sublayer that configures an optimal transmission scheme between end nodes transmitting signals among a plurality of transmission schemes. The AN sublayer 526 may be configured to determine one signal transmission scheme by performing negotiation with other end nodes based on a plurality of signal transmission schemes. In addition, the AN sublayer 526 may be configured to determine master-slave relationship of the plurality of end nodes. For example, when receiving a signal from another end node, the AN sublayer 526 may be configured to determine whether the end node transmitting the signal is a master node or a slave node.

The PHY layer of the Ethernet layer model may be connected to a physical medium through a medium dependent interface (MDI) 527. The MDI 527 may be configured to receive the physical signal from the PMD sublayer 525 and transmit the signal through the physical medium. The MDI 527 of the Ethernet layer model may correspond to the PHY layer 520 of the OSI reference model.

Hereinafter, a method performed at an end node belonging to a vehicle network and a method performed at a corresponding counterpart end node will be described. Even when a method (e.g., transmission or reception of a signal) to be performed at a first end node is described, a corresponding second end node may perform a method (e.g., reception or transmission of the signal) corresponding to the method performed at the first end node. In other words, when an operation of the first end node is described, the corresponding second end node may be configured to perform an operation that corresponds to the operation of the first end node. Conversely, when an operation of the second end node is described, the corresponding first end node may be configured to perform an operation that corresponds to the operation of the second end node.

In particular, each of a plurality of end nodes may be configured to perform the following operations through at least one instruction stored in the memory. FIG. 6 is a sequence chart illustrating a first exemplary embodiment of an operation method of end nodes belonging to a vehicle network. As shown in FIG. 6, each of a plurality of end nodes 410, 420, and 430 may be connected to an Ethernet-based vehicle network. In the Ethernet-based vehicle network, each of the end nodes may be a master node or a slave node. Specifically, the end nodes may be classified into one master node and a plurality of slave nodes.

A PHY layer unit of each of the end nodes 410, 420, and 430 may have a PHY identifier (ID) which is a unique identifier. The PHY IDs of the end nodes 410, 420, and 430 may be configured to determine master-slave relationship between the end nodes 410, 420, and 430. For example, an end node having a PHY ID of 0 may be determined as a master node (e.g., the end node 410), and an end node whose PHY ID is not 0 may be determined as a slave node (e.g., the end node 420 or 430).

A controller unit of an end node configured to detect an event from the outside among the plurality of end nodes may be configured to transition an operation state thereof from a sleep state to a wake-up state. The wake-up controller unit may be configured to wake up a PHY layer unit connected with the controller unit. The PHY layer unit of the wake-up end node (i.e., one of the master node 410 and the slave nodes 420 and 430) may be configured to determine and perform an operation after the wake-up according to the master-slave relationship of the end node (i.e., whether the end node is a master node or a slave node).

The end node 420 waking up in the step S601 may be a slave node whose PHY ID is not 0. The controller unit of the slave node 420 waking up by detecting a local event may be configured to wake up a PHY layer unit thereof. Then, the slave node 420 that does not receive a beacon from the master node 410 may be configured to maintain a standby state until receiving the beacon from the master node 410 (S602). If the slave node 420 does not receive the beacon, the slave node 420 may be configured to maintain the standby state until the master node 410 wakes up and transmits the beacon (S602).

The end node waking up in the step S603 may be a master node having a PHY ID of 0. The controller unit of the master node 410 that has detected an event may wake up a PHY layer unit thereof by transmitting a wake-up signal to the PHY layer unit of the master node 410. The PHY layer unit of the master node 410 may be configured to receive the wake-up signal and wake up (S603).

The master node 410 waking up in the step S603 may be configured to start a beacon timer and generate a beacon (S604). The beacon generated immediately after the master node 410 wakes up in the S603 (S604) may be referred to as a first beacon. The master node 410 may be configured to transmit the first beacon generated in the S604 to the slave nodes 420 and 430 connected to the network (S605). The slave nodes 420 and 430 may be configured to receive the first beacon from the master node 410 (S605), and the slave node 420 receiving the first beacon from the master node 410 may be configured to synchronize the transmission opportunity counter included in the slave node 402 (S606).

Each of the PHY layer units of the slave nodes 420 and 430 may be configured to identify a transmission opportunity counter to determine whether a data packet transmission opportunity is granted thereto. The PHY layer unit of each of the slave nodes 420 and 430 may be configured to determine whether a transmission opportunity is granted to each of the slave nodes 420 and 430 based on the identified transmission opportunity counter.

When the slave nodes 420 and 430 receive the first beacon from the master node 410 and synchronize the respective transmission opportunity counters, the transmission opportunity counters of the end nodes 410, 420 and 430 may be set to 0 (S606). After the transmission opportunity counters of the master node 410 and the slave nodes 420 and 430 are synchronized, the master node 410 may be configured to stop the beacon timer. When transmission and reception of a beacon of an end node (or the first beacon) is completed, a transmission cycle (or, bus cycle) in which the end nodes 410, 420, and 430 connected to the network capable of transmitting data packets may be started (S607).

Figure 7A:
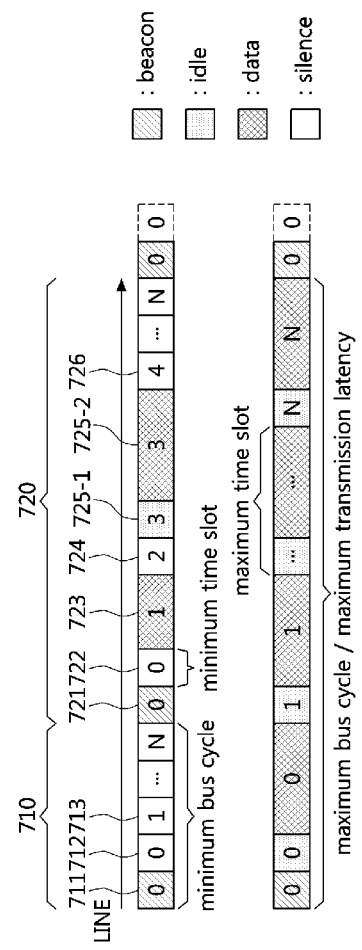
FIG. 7A is a conceptual diagram illustrating transmission cycles for normal end nodes according to an exemplary embodiment.

FIG. 7A is a conceptual diagram illustrating a transmission cycle for normal end nodes. As shown in FIG. 7A, one transmission cycle may include a plurality of time slots. The first time slot of the transmission cycle may be a time slot after a time slot 711 in which a master node transmits a beacon. When one master node 410 and N slave nodes (e.g., 420 and 430) are connected to the vehicle network, one transmission cycle may include the time slot 712 in which the master node 410 may transmit data and N time slots starting from a time slot 713, in which the N slave nodes may transmit data, and thus the one transmission cycle may include a total of (N+1) time slots. In one time slot, one end node may be configured to acquire a data packet transmission opportunity. The end node that has acquired the data packet transmission opportunity may be configured to transmit a data packet to another node in the corresponding time slot.

The lengths of the remaining time slots except the first time slot 711 in which the beacon is transmitted may vary based on the operation of the end node that has acquired the transmission opportunity. For example, each of the time slots 712, 713, 722, and 724 without a data transmission operation of the corresponding end node for a preconfigured time may be a 'silence slot'. The time slot 725-1 in which the corresponding end node fails to perform a transmission operation due to a transmission latency after the starting time point of the corresponding time slot may be an 'idle slot'. Each of the time slots 723 and 725-2 in which the corresponding end node transmits data to other end nodes may be a 'data slot', and the length of each of the data slots 723 and 725-2 may be proportional to the length of data transmitted by the corresponding end node. The length of the transmission period may vary based on the lengths of time slots included in the transmission cycle.

Figure 7B:
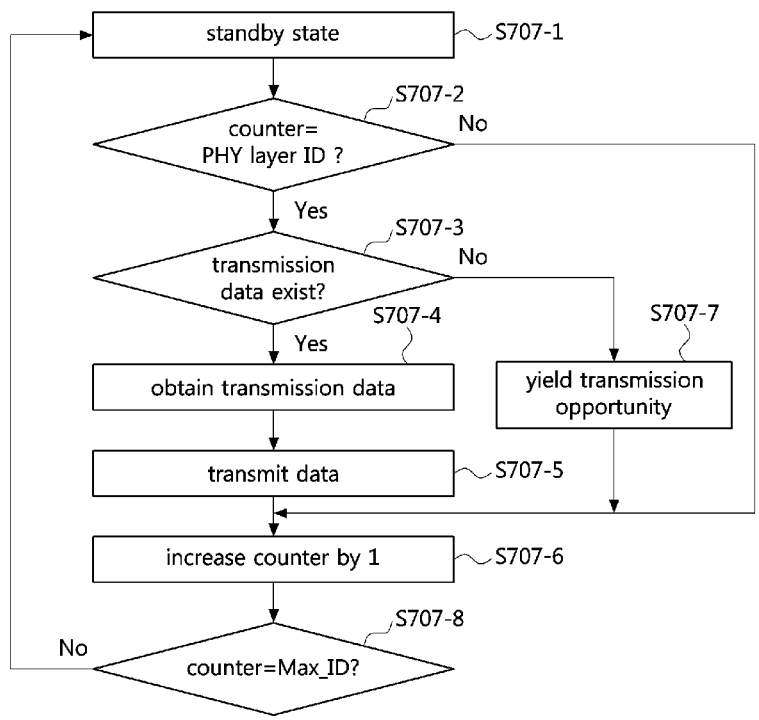
FIG. 7B is a flow chart illustrating an exemplary embodiment of a transmission operation method of an end node during the transmission cycle according to FIG. 7A of an exemplary embodiment.

FIG. 7B is a flow chart illustrating an exemplary embodiment of a transmission operation method of an end node during the transmission cycle according to FIG. 7A. As shown in FIG. 7B, when a transmission cycle is started, the end nodes 410, 420, and 430 may maintain a standby state (S707-1). When a collision between two or more data packets is detected in a PHY layer, the master node 410 may be configured to terminate the transmission cycle and generate a beacon again. The master node 410 may be configured to transmit the regenerated beacon, and the slave nodes 420 and 430 may be configured to receive the beacon from the master node 410. Upon receiving the beacon, the slave nodes 420 and 430 may be configured to resynchronize their transmission opportunity counters.

Each of the end nodes 410, 420, and 430 may be configured to determine whether a transmission opportunity is granted based on a transmission opportunity counter (S707-2). A PHY layer unit of the end node may be configured to compare a transmission opportunity counter with a PHY ID of the end node (S707-2). The transmission opportunity counter may be equal to the index of the time slot of the transmission cycle.

End nodes with PHY IDs different from the number indicated by the transmission opportunity counter may not acquire a data transmission opportunity, and the PHY layer units of the end nodes may maintain a standby state for a preconfigured time. After the preconfigured time elapses, the PHY layer units of the end nodes that do not acquire the transmission opportunity may be configured to increase the number of respective transmission opportunity counters by 1 (S707-6).

The PHY layer unit of the end node having the same PHY ID as the number indicated by the transmission opportunity counter may be configured to acquire an opportunity to transmit data. The end node granted the data transmission opportunity may be configured to determine whether there is a data packet to be transmitted to other end nodes (S707-3). A controller unit of the end node may be configured to determine whether there is a data packet to be transmitted to other end nodes (S707-3). The controller unit of the end node may also be configured to transmit a data packet to be transmitted to other end nodes to the PHY layer unit (S707-4).

The PHY layer unit of the end node that has acquired the transmission opportunity may be configured to transmit the data packet obtained from the controller unit of the end node to other end nodes connected to the vehicle network (S707-5). The PHY layer unit of the end node that has completed the data packet transmission may be configured to terminate the transmission opportunity. When the data transmission operation is completed, the PHY layer units of the end nodes may be configured to increase respective transmission opportunity counters by 1 (707-6).

The PHY layer unit of the end node acquiring the transmission opportunity but having no data packet to transmit to other end nodes (e.g., an end node having not obtained a data packet from the controller unit) may yield the data transmission opportunity to another end node (S707-7). After a preconfigured time elapses, the PHY layer unit of the end node performing the operation of yielding the transmission opportunity may be configured to terminate the data packet transmission procedure by terminating the transmission opportunity. When the data packet transmission procedure ends, the PHY layer units of the end nodes connected to the network may be configured to increase respective transmission opportunity counters by 1 (S707-6).

An initial value of the transmission opportunity counter may be set to 0, and the maximum value of the transmission opportunity counter may be one less than the number of end nodes existing in the communication network, which may be referred to as Max_ID. Accordingly, when one master node 410 and N slave nodes (e.g., 420 and 430) are connected to the network, data transmission opportunities may be given to sequentially from the master node 410 having a PHY layer ID of 0 to the slave node having a PHY layer ID of N. In addition, the end node that sequentially acquires the data transmission opportunity may be configured to transmit data to other nodes. The end nodes connected to the network may be configured to repeat the data transmission operation or the standby operation until the transmission opportunity counter becomes Max_ID.

The master node may be configured to compare the preconfigured Max_ID with the transmission opportunity counter of the node (S707-8). When the transmission opportunity counter is less than Max_ID, the PHY layer unit of the end node having the same PHY ID as the number of incremented transmission opportunity counters may be configured to acquire a data transmission opportunity. When the transmission opportunity counter is equal to Max_ID, the first transmission cycle may end (S708).

Referring back to FIG. 6, after the first transmission cycle ends, the master node 410 may be configured to generate a beacon (S610). The beacon generated after the end of the first transmission cycle may be referred to as a second beacon. The master node 410 may be configured to transmit the second beacon generated in the step S610 to the other slave nodes 420 and 430 connected to the network (S611).

The PHY layer units of the slave nodes 420 and 430 may be configured to receive the second beacon signal from the master node 410 (S610). The slave nodes 420 and 430 may be configured to synchronize respective transmission opportunity counters based on the received second beacon (S611). As a result of the synchronization operation, the PHY layer units of the master node 410 and the slave nodes 420 and 430 connected to the network may be configured to set respective transmission opportunity counters to 0 to synchronize their transmission opportunity counters (S611).

When a beacon timer of the master node 410 is expired and a beacon of the end node (or, the second beacon) is transmitted and received, a new transmission cycle may start (S612). Even after the transmission cycle in the step S612 ends (S613), the master node 410 and the slave nodes 420 and 430 connected to the network may repeat transmission cycles.

Figure 8A:
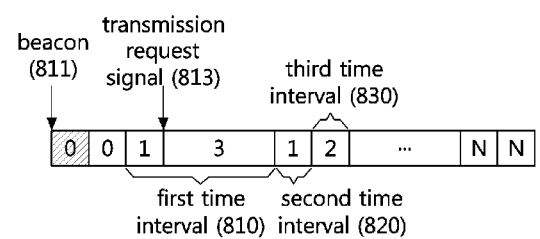
FIG. 8A is a conceptual diagram illustrating a priority-based transmission cycle of end nodes according to a first exemplary embodiment of the present disclosure.

FIG. 8A is a conceptual diagram illustrating a priority-based transmission cycle of end nodes according to a first exemplary embodiment of the present disclosure. As shown in FIG. 8A, one transmission cycle may include a plurality of time slots. The first time slot of the transmission cycle may be a time slot after a time slot in which a master node transmits a beacon 811. In one time slot, one end node may be configured to acquire a data packet transmission opportunity. The end node that has obtained the data packet transmission opportunity may be configured to transmit a data packet to another node. The duration of each of the remaining time slots except the time slot in which the beacon 811 is transmitted may vary based on the operation of the end node that has acquired the transmission opportunity in the each corresponding time slot.

When one master node 410 and N slave nodes (e.g., 420, 430, and 440) are connected to the vehicle network, the transmission cycle according to the first exemplary embodiment of the present disclosure may be configured to assign a high priority to an end node having a high importance. An end node that transmits a transmission request signal 813 to another end node may be an end node where emergency or important data has been generated, and for example, the emergency or important data may be data related to a brake operation, or data related to an airbag operation.

The transmission request signal 813 may be a low power idle (LPI) signal generated by an end node that supports an energy efficient Ethernet (EEE) function. The EEE refers to Ethernet-based computer networking technology that lowers power consumption at times of low data consumption. Meanwhile, an end node having the EEE function may be configured to independently perform an LPI signaling process for reducing power and energy consumed when there is no data to transmit. An end node according to the present disclosure may have the EEE function and may be configured to transmit an LPI signal whose energy may be sensed. Meanwhile, the transmission request signal 813 may be a 4-bit PLCA signal. In particular, the 4-bit PLCA signal may be one of bit streams 0100 to 1101 reserved in the IEEE 802.3 document.

In the transmission cycle according to the first exemplary embodiment of the present disclosure, the first end node may have a transmission opportunity in a first time interval 810 configured for communication of the first end node. In particular, the first time interval 810 may refer to a time interval that includes one or more time slots. When the first end node detects the transmission request signal 813 transmitted from a second end node in the first time interval 810, the first end node may stop a transmission operation in the first time interval 810. Particularly, the second end node that has transmitted the transmission request signal 813 may be configured to perform a transmission operation in the first time interval 810. When the transmission operation of the second end node is completed in the first time interval 810, the first end node may be configured to perform the transmission operation in a second time interval 820 after the first time interval 810.

Meanwhile, when the second end node transmits the transmission request signal 813, a third end node that is scheduled to perform a transmission operation in the second time interval 820 may be configured to change a time interval for performing a transmission operation to a third time interval 830 after the second time interval 820. Detailed operations of each end node according to the first exemplary embodiment of the present disclosure will be described in detail with reference to FIGS. 9A and 9B described below.

Figure 8B:
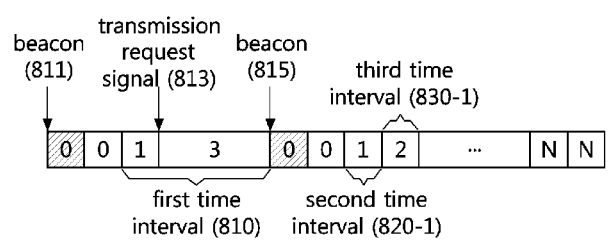
FIG. 8B is a conceptual diagram illustrating a priority-based transmission cycle of end nodes according to a second exemplary embodiment of the present disclosure.

FIG. 8B is a conceptual diagram illustrating a priority-based transmission cycle of end nodes according to a second exemplary embodiment of the present disclosure. As show in FIG. 8B, in a transmission cycle according to the second exemplary embodiment of the present disclosure, a first end node may have a transmission opportunity in a first time interval 810 configured for communication of the first end node.

When the first end node detects a transmission request signal 813 from a second end node in the first time interval 810, the first end node may be configured to stop a transmission operation in the first time interval 810. In particular, the second end node that has transmitted the transmission request signal 813 may be configured to perform a transmission operation in the first time interval 810. When the transmission operation of the second end node is completed in the first time interval 810, the first end node may be configured to receive a beacon 815 from an end node acting as a master node. The beacon may include information on a second time interval 820-1 in which the first end node may be configured to perform a transmission operation. The first end node may be configured to perform a transmission operation in the second time interval 820-1 indicated by the beacon 815.

Meanwhile, a third end node that is scheduled to perform a transmission operation in a previously scheduled time interval may be configured to perform a transmission operation in a third time interval 830-1 indicated by the beacon 815. The beacon 815 may further include information regarding the third time interval 830-1 in which the third end node may be configured to perform a transmission operation. Detailed operations of each end node according to the second exemplary embodiment of the present disclosure will be described in detail with reference to FIGS. 9A and 9B described below.

Figure 10:
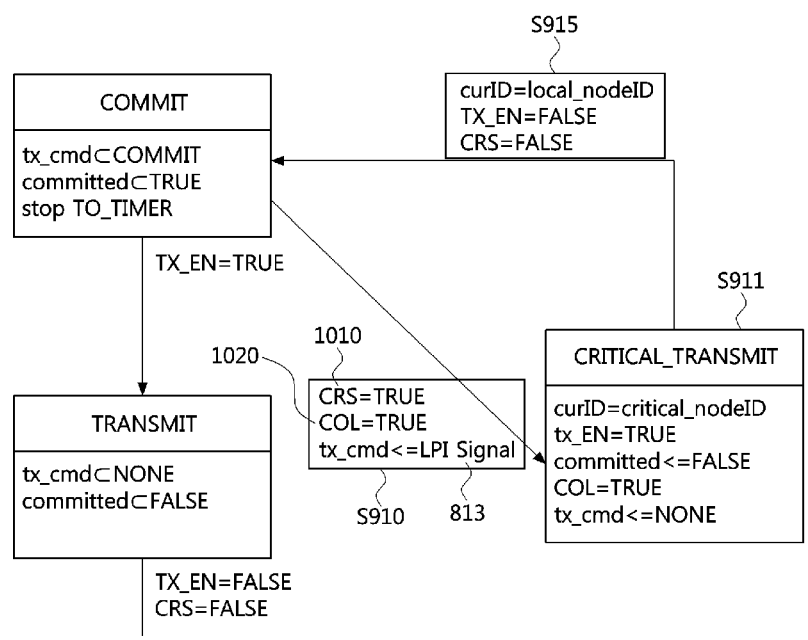
FIGS. 10 and 11 are state transition diagrams illustrating the steps S910, S911, and S915 of FIG. 9B according to an exemplary embodiment.
Figure 11:
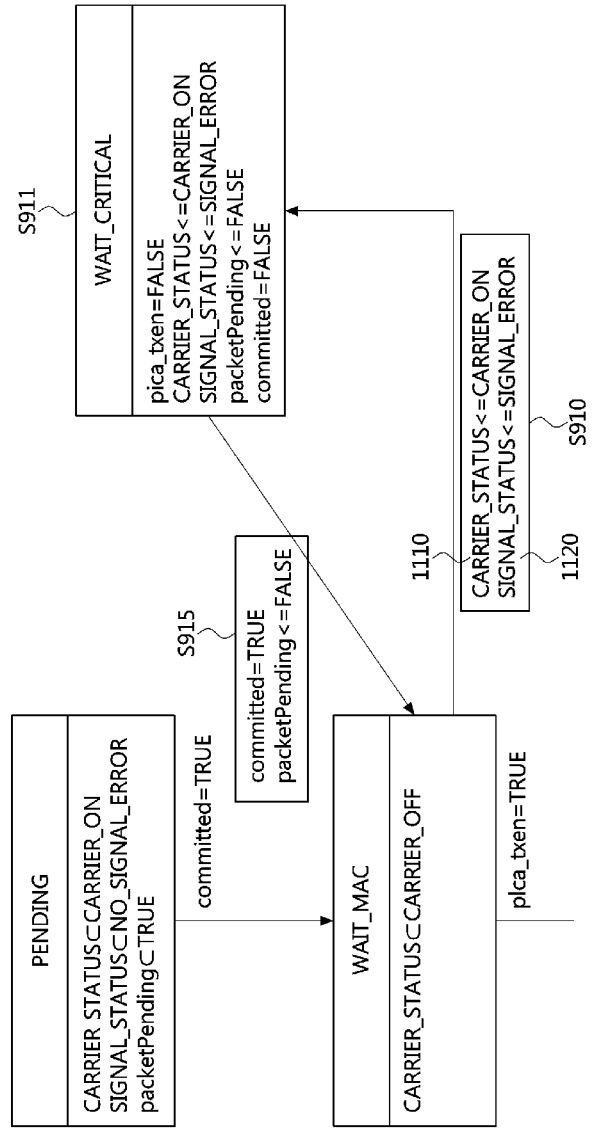

FIGS. 9A and 9B are sequence charts illustrating an exemplary embodiment of an operation method of an end node during the transmission cycle according to FIG. 8A or 8B, and FIGS. 10 and 11 are state transition diagrams illustrating the steps S910, S911, and S915 of FIG. 9B. Particularly, FIG. 10 illustrates a PLCA control state diagram for operations of the first end node 420 according to the present disclosure, and FIG. 11 illustrates a PLCA data state diagram for operations of the first end node 420 according to the present disclosure. In the steps S910, S911, and S915, the operation method of the end node will be described in detail with reference to FIGS. 10 and 11.

As shown in FIGS. 8A, 8B, 9A, and 9B, each of the plurality of end nodes 410, 420, 430, and 440 may be connected to an Ethernet based vehicle network. Each end node in the Ethernet based vehicle network may be a master node or a slave node. Specifically, the end nodes may be classified into one master node and a plurality of slave nodes.

A physical (PHY) layer unit of each of the end nodes 410, 420, 430, and 440 may be configured with a unique PHY identifier (ID). The PHY IDs of the end nodes 410, 420, 430, 440 may provide a determination of master-slave relationship for the end nodes 410, 420, 430, and 440. For example, an end node having a PHY ID of 0 may be determined as the master node 410, and an end node whose PHY ID is not 0 may be determined as slave nodes 420, 430, and 440.

A controller unit of an end node that detects an event from the outside among the plurality of end nodes may be configured to transition an operation state thereof from a sleep state to a wake-up state (S901). The wake-up controller unit may be configured to wake up a PHY layer unit connected with the controller unit. The PHY layer unit of the wake-up end node (i.e., one of the master node 410 and the slave nodes 420, 430, and 440) may be configured to determine and perform an operation after the wake-up according to the master-slave relationship of the end nodes.

The end node 420 waking up in the step S901 may be a slave node whose PHY ID is not 0. The controller unit of the slave node 420 waking up by detecting a local event may be configured to wake up a PHY layer unit thereof. Then, the slave node 420 that does not receive a beacon from the master node 410 may maintain a standby state until receiving the beacon from the master node 410 (S902). If the slave node 420 does not receive the beacon, the slave node 420 may maintain the standby state until the master node 410 wakes up and transmits the beacon (S902).

The end node waking up in a step S903 may be a master node having a PHY ID of 0. The controller unit of the master node 410 that has detected an event may be configured to wake up a PHY layer unit thereof by transmitting a wake-up signal to the PHY layer unit of the master node 410. The PHY layer unit of the master node 410 may be configured to receive the wake-up signal and wake up (S903). The master node 410 waking up in the step S903 may be configured to start a beacon timer and generate a beacon (S904). The beacon generated immediately after the master node 410 wakes up in the S903 (S904) may be referred to as a first beacon. The master node 410 may be configured to transmit the first beacon generated in the S904 to the slave nodes 420 and 430 connected to the network (S905).

The slave nodes 420, 430, and 440 may be configured to receive the first beacon from the master node 410 (S905), and the slave node 420 receiving the first beacon from the master node 410 may be configured to synchronize a transmission opportunity counter included in the slave node 402 (S906). Each of the end nodes 410, 420, 430, and 440 may be configured to determine whether a transmission opportunity is granted to each based on respective transmission opportunity counter. The transmission opportunity counter may have a value that corresponds to an index of a time slot of the transmission cycle.

The first end node 420 may have a transmission opportunity in the first time interval 810 configured for communication of the first end node 420. The first time interval 810 may include a time slot in which the first end node 420 does not perform a transmission operation due to a transmission latency and remains in a standby state (S907). The first end node 420 may be configured to perform a monitoring operation in the first time interval 810.

Meanwhile, when emergency or important data occurs in the second end node, the second end node 430 may be configured to generate the transmission request signal 813 that indicates that data to be transmitted exists (S908). The transmission request signal 813 may be used to indicate that there is emergency data to be transmitted from the second end node 430, and may include an identifier of the second end node 430. The transmission request signal 813 may further include priority information indicating a transmission priority of the second end node 430, and may further include a timer value that indicates a transmission time during which the second end node 430 performs a transmission operation in the first time interval 810.

The second end node 430 may be configured to transmit the transmission request signal 813 in the first time interval 810 (S909). The first end node 420 and the third end node 440 may be configured to detect the transmission request signal 813 transmitted from the second end node 430 by a monitoring operation of the first end node 420 performed in the step S907.

Referring to FIG. 10, the first end node 420 may be configured to detect the transmission request signal 813 transmitted from the second end node 430 by the monitoring operation performed in the step S907. In particular, the first end node 420 may include a first entity configured to perform a physical (PHY) layer function and a second entity configured to perform a medium access control (MAC) layer function. When the transmission request signal 813 (e.g., LPI signaling) indicating that emergency data exists is input to a tx_cmd of the first end node 420, a first indicator 1010 (e.g., a carrier sense (CRS) set to TRUE) indicating that the transmission request signal 813 is detected, and a second indicator 1020 (e.g., a collision detect (COL) set to TRUE) indicating that a collision has occurred in the first time interval may be transferred from the first entity to the second entity.

Referring to FIG. 11, when the first indicator 1010 and the second indicator 1020 are transferred from the first entity to the second entity, the second entity may be configured to set CARRIER_STATE to a third indicator 1110 (e.g., CARRIER_ON) indicating a situation in which the transmission request signal 813 has been detected, and may be configured to set SIGNAL_STATUS to a fourth indicator 1120 (e.g., SIGNAL_ERROR) indicating that a collision has occurred. Accordingly, the first end node 430 may be configured to transition to a state where a collision occurs and stop the transmission operation.

When the transmission request signal 813 is detected by the monitoring operation, the first end node 420 may be configured to stop the transmission operation of the first end node 420 in the first time interval 810. When the second end node 430 is determined to have a transmission priority higher than that of the first end node 420 based on the priority information included in the transmission request signal 813, the first end node 420 may be configured to stop the transmission operation (S911).

Referring to FIG. 10, when the first indicator 1010 and the second indicator 1020 may be transferred from the first entity to the second entity in the step S910, the second entity may be configured to set TX_EN to TRUE, committed to FALSE, and COL to TRUE to prevent the first end node 420 from performing the transmission operation (S911). Accordingly, the first end node 420 may be configured to stop the transmission operation in the first time interval 820. Meanwhile, when the transmission operation of the first end node 420 is stopped, curID may be set to an identifier (e.g., critical_nodeID) of the second end node 430 that communicates in the first time interval 810.

Referring to FIG. 11, when CARRIER_STATE is set to the third indicator 1110 indicating the situation in which the transmission request signal 813 has been detected, and SIGNAL_STATUS is set to the fourth indicator 1120 indicating that a collision has occurred, the second entity may be configured to set plca_txen, which is set to TRUE when transmitting data, to FALSE, and set packetPending and committed, which are set to TRUE when obtaining a transmission opportunity, to FALSE. Accordingly, the data of the first end node 430 may not be transferred from the MAC layer to the PHY layer.

When the transmission request signal 813 is detected by the monitoring operation performed in the step S907, the third end node 440 may be configured to change a time interval configured for communication of the third end node 440 from the second time interval 820 to a third time interval 830 after the second time interval 820 (S912).

The second end node 430 may be configured to perform a transmission operation in the first time interval 810 (S913). In other words, the first time interval 810 may be used for communication of the second end node 430 that transmitted the transmission request signal. Based on the priority information included in the transmission operation signal 813, when the transmission priority of the second end node 430 is higher than the transmission priority of the first end node 420, the second end node 430 may be configured to perform a transmission operation in the first time interval 810. The first time interval 810 may include a time slot in which the second end node 430 performs a transmission operation. The second end node 430 may be configured to complete the transmission operation in the first time interval 810 (S914).

The first end node 420 may be configured to resume the transmission operation stopped in the step S911 and perform the transmission operation (S915). The time point at which the first end node resumes the transmission operation may be a time point when a timer set based on the timer value included in the transmission request signal 813 expires. When the transmission operation of the second end node 430 is completed in the first time interval 810, the first end node 420 may be configured to perform a transmission operation in the second time interval 820 after the first time interval 810. The second time interval 820 may include a time slot in which the first end node 420 performs a transmission operation.

Referring to FIG. 10, when the second end node 430 completes the transmission operation in the first time interval 820, the second entity may be configured to set TX_EN to FALSE and CRS to FALSE to cause the first end node 420 to perform the transmission operation. In particular, curID may be set to an identifier (e.g., local_nodeID) of the first end node 420 that communicates in the second time interval 820 after the first time interval 810.

Referring to FIG. 11, when TX_EN is set to FALSE and CRS is set to FALSE, the second entity may be configured to set packetPending and committed to TRUE. Accordingly, data of the first end node 430 may be transmitted from the MAC layer to the PHY layer. Alternatively, when the transmission operation of the second end node 430 is completed in the step S914, the first end node 420 may be configured to receive a beacon 815 from the end node 410 acting as a master node and initialize a transmission cycle. The beacon 815 may include information regarding the second time interval 820-1 for the first end node 420 to perform a transmission operation. In particular, the first end node 420 may be configured to perform the transmission operation in the second time interval 820-1 indicated by the beacon 815.

The third end node 440 may be configured to perform a transmission operation in the third time interval 830 (S916). The transmission operation of the third end node 440 may be resumed after a timer set based on the timer value included in the transmission request signal 813 expires and the transmission operation of the first end node 420 is completed. The third time interval 830 may include a time slot in which the third end node 440 performs a transmission operation.

Alternatively, the third end node 440, which is previously scheduled to perform the transmission operation in the second time interval 820, may be configured to initialize a transmission cycle by the beacon 815. The beacon 815 may include information regarding the third time interval 830-1 for the third end node 440 to perform a transmission operation. In particular, the third end node 440 may be configured to perform the transmission operation in the third time interval 830-1 indicated by the beacon 815.

According to the exemplary embodiments of the present disclosure, an idle slot during which other end nodes do not have data to transmit may be used to allow an end node that requires urgent data transmission to rapidly perform a transmission operation of the data. Therefore, it may be possible to rapidly perform an operation such as a brake operation or airbag operation directly related to the safety of the vehicle.

The methods according to exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software. Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module in order to perform the operation of the present disclosure, and vice versa.

While the exemplary embodiments of the present disclosure and their advantages have been described in detail above, it should be understood that various changes, substitutions and alterations may be made herein without departing from the scope of the disclosure.

What is claimed is:

1. An operation method of a first end node in a vehicle network supporting a physical layer collision avoidance (PLCA) function, comprising:
   performing, by a controller, a monitoring operation in a first time interval configured for communication of the first end node;
   detecting, by the controller, a transmission request signal transmitted from a second end node by the monitoring operation;
   in response to detecting the transmission request signal, stopping, by the controller, a transmission operation of the first end node in the first time interval;
   receiving, by the controller, a beacon from a third end node when the transmission operation of the second end node is completed in the first time interval; and
   performing, by the controller, the transmission operation of the first end node in a second time interval indicated by the beacon,
   wherein the first time interval is used for communication of a second end node instead of the first end node.

2. The operation method according to claim 1, wherein the first end node includes a first entity configured to perform a physical (PHY) layer function and a second entity configured to perform a medium access control (MAC) layer function, and in response to detecting the transmission request signal, a first indicator indicating that the transmission request signal is detected and a second indicator indicating that a collision occurs in the first time interval are transmitted from the first entity to the second entity.

3. The operation method according to claim 2, wherein when the first indicator and the second indicator are received at the second entity, data transmission is prevented from the second entity to the first entity.

4. The operation method according to claim 1, wherein the transmission request signal is a low power idle (LPI) signal generated by the second end node that supports an energy efficient Ethernet (EEE) function.

5. The operation method according to claim 1, wherein the transmission request signal includes an identifier of the second end node, and the transmission request signal is used to indicate that there is emergency data to be transmitted at the second end node indicated by the identifier.

6. The operation method according to claim 1, wherein the transmission request signal includes information that indicates a transmission priority of the second end node, and the transmission operation of the first end node is stopped in the first time interval when the transmission priority of the second end node is higher than a transmission priority of the first end node.

7. The operation method according to claim 1, wherein the transmission request signal includes a timer value that indicates a transmission time during which the second end node performs a transmission operation, and the transmission operation of the first end node is resumed after a timer set based on the timer value expires.

8. The operation method according to claim 7, wherein the first end node includes a first entity configured to perform a physical (PHY) layer function and a second entity performing a medium access control (MAC) layer function, the timer value included in the transmission request signal is transferred from the first entity to the second entity, and when a timer set based on the timer value expires, data is transferred from the second end node to the first entity.

9. The operation method according to claim 1, further comprising, when the transmission operation of the second end node is completed in the first time interval, performing the transmission operation of the first end node in a second time interval after the first time interval.

10. An operation method of a first end node in a vehicle network supporting a physical layer collision avoidance (PLCA) function, comprising:
generating, by a controller, a transmission request signal indicating that data to be transmitted exists;
transmitting, by the controller, the transmission request signal in a first time interval configured for communication of a second end node; and
performing, by the controller, a transmission operation of the first end node in the first time interval,
wherein the first time interval is used for communication of the first end node instead of the second end node, and the transmission request signal is a low power idle (LPI) signal generated by the first end node that supports an energy efficient Ethernet (EEE) function.

11. The operation method according to claim 10, wherein the transmission request signal includes an identifier of the first end node, and the transmission request signal is used to indicate that there is emergency data to be transmitted at the first end node indicated by the identifier.

12. The operation method according to claim 10, wherein the transmission request signal includes a timer value that indicates a transmission time during which the first end node performs a transmission operation, and the transmission operation of the second end node is resumed after a timer set based on the timer value expires.

13. The operation method according to claim 10, wherein the transmission request signal includes information that indicates a transmission priority of the first end node, and the transmission operation of the first end node is performed in the first time interval when the transmission priority of the first end node is higher than a transmission priority of the second end node.

14. An operation method of a first end node in a vehicle network supporting a physical layer collision avoidance (PLCA) function, comprising:
detecting, by a controller, a transmission request signal transmitted from a third end node in a first time interval configured for communication of a second end node;
in response to detecting the transmission request signal, changing, by the controller, a time interval configured for communication of the first end node from a second time interval to a third time interval after the second time interval; and
performing, by the controller, a transmission operation of the first end node in the third time interval,
wherein a transmission operation of the third end node is performed in the first time interval, and the transmission operation of the second end node is performed in the second time interval after the first time interval.

15. The operation method according to claim 14, wherein the first end node includes a first entity configured to perform a physical (PHY) layer function and a second entity configured to perform a medium access control (MAC) layer function, and in response to detecting the transmission request signal, a first indicator that indicates that the transmission request signal is detected and a second indicator that indicates that a collision occurs in the first time interval are transmitted from the first entity to the second entity.

16. The operation method according to claim 14, wherein the transmission request signal is a low power idle (LPI) signal generated by the third end node that supports an energy efficient Ethernet (EEE) function.

17. The operation method according to claim 14, wherein the transmission request signal includes an identifier of the third end node, and the transmission request signal is used to indicate that there is emergency data to be transmitted at the third end node indicated by the identifier.

18. The operation method according to claim 14, wherein the transmission request signal includes a timer value that indicates a transmission time during which the third end node performs a transmission operation, and the transmission operation of the first end node is resumed after a timer set based on the timer value expires and the transmission operation of the second end node is completed.

* * * * *